United States Patent
Rong et al.

(10) Patent No.: US 8,026,002 B2
(45) Date of Patent: Sep. 27, 2011

(54) BATTERY CATHODE, A LITHIUM ION BATTERY USING THE SAME AND PROCESSES FOR PREPARATION THEREOF

(75) Inventors: Qiang Rong, Guangdong (CN); Zhanfeng Jiang, Guangdong (CN); Huiquan Liu, Guangdong (CN); Gang Hu, Guangdong (CN); Meihong Sun, Guangdong (CN)

(73) Assignee: BYD Company Limited, Gangdong (CN)

( * ) Notice: Subject to any disclaimer, the term of this patent is extended or adjusted under 35 U.S.C. 154(b) by 990 days.

(21) Appl. No.: 11/912,655

(22) PCT Filed: Apr. 20, 2006

(86) PCT No.: PCT/CN2006/000739
§ 371 (c)(1), (2), (4) Date: Oct. 25, 2007

(87) PCT Pub. No.: WO2006/114047
PCT Pub. Date: Nov. 2, 2006

(65) Prior Publication Data
US 2008/0182170 A1 Jul. 31, 2008

(30) Foreign Application Priority Data
Apr. 28, 2005 (CN) .......................... 2005 1 0066597

(51) Int. Cl.
*H01M 4/50* (2010.01)
(52) U.S. Cl. ..................... 429/223; 429/209; 429/231.3; 429/224; 427/126.6; 29/632.2
(58) Field of Classification Search .................. 429/209, 429/223, 231.3, 224; 427/126.6; 29/623.2
See application file for complete search history.

(56) References Cited

U.S. PATENT DOCUMENTS

| | | | | |
|---|---|---|---|---|
| 5,312,611 A | * | 5/1994 | Takami et al. | 423/447.6 |
| 5,783,328 A | | 7/1998 | Wang | |
| 6,114,063 A | | 9/2000 | Katsumoto et al. | |
| 2004/0200998 A1 | | 10/2004 | Park et al. | |
| 2004/0223906 A1 | * | 11/2004 | Wang et al. | 423/594.4 |
| 2007/0212608 A1 | | 9/2007 | Liu et al. | |

FOREIGN PATENT DOCUMENTS

| | | |
|---|---|---|
| CN | 1282113 | 1/2001 |
| CN | 1549365 | 11/2004 |
| CN | 1635644 | 7/2005 |
| CN | 1753217 | 3/2006 |
| JP | 7-235292 A | 9/1995 |
| JP | 8-162114 A | 6/1996 |
| JP | 09-035715 A | 2/1997 |

(Continued)

OTHER PUBLICATIONS

International Search Report for PCT/CN2006/000739 (3 pages).

(Continued)

*Primary Examiner* — Jane Rhee
(74) *Attorney, Agent, or Firm* — Osha • Liang LLP

(57) ABSTRACT

A battery cathode including a current collector and a cathode material coated on and/or filled in the current collector, said cathode material including a cathode active substance, a conductive additive and an adhesive, wherein said cathode material is coated with a layer of lithium cobaltate on the surface thereof and the content of lithium cobaltate is 0.1-15 wt % (weight percent) based on the weight of the cathode active substance. The lithium ion battery using the cathode provided by the present invention has a higher specific capacity and improved cycling performance.

12 Claims, 2 Drawing Sheets

FOREIGN PATENT DOCUMENTS

| | | |
|---|---|---|
| JP | 09-050810 A | 2/1997 |
| JP | 10-236826 A | 9/1998 |
| JP | 11-071114 A | 3/1999 |
| JP | 2000/169152 A | 6/2000 |
| JP | 2001-313033 | 11/2001 |
| JP | 2002-42890 | 2/2002 |
| JP | 2002-151078 | 5/2002 |
| JP | 2003-272618 A | 9/2003 |
| KR | 10-0315227 B1 | 11/2001 |
| WO | 03/092099 A1 | 11/2003 |

OTHER PUBLICATIONS esp@cenet English Abstract for CN1282113 (1 page).

Office Action issued Oct. 28, 2009, by The Korean Intellectual Property Office in related Korean Patent Application No. 10-2007-7027757, with English translation (8 pages).

1st Office Action mailed Feb. 15, 2008, by the State Intellectual Property Office of People's Republic of China in related Chinese Patent Application No. 2005100665970 (with English translation) (7 pages).

2nd Office Action mailed Oct. 30, 2009, by the State Intellectual Property Office of People's Republic of China in related Chinese Patent Application No. 2005100665970 (with English translation) (7 pages).

Notification of Rejection (Office Action) mailed Apr. 5, 2011, by the Japan Patent Office in related Japanese Patent Application No. 2008-508054, with English translation (7 pages).

Extended European Search Report dated May 26, 2011, issued by the European Patent Office—Germany, in related European Patent Application No. EP-06722382.6 (5 pages).

\* cited by examiner

BATTERY CATHODE, A LITHIUM ION BATTERY USING THE SAME AND PROCESSES FOR PREPARATION THEREOF

FIELD OF THE INVENTION

The present invention relates to a battery cathode, a battery using the same and processes for preparation thereof, and more particularly, it relates to a battery cathode, a lithium ion battery using the same and processes for preparation thereof.

BACKGROUND OF THE INVENTION

As a chemical power source, a Lithium ion battery is referred to as a secondary battery comprising a cathode formed from a compound able to reversibly intercalate and de-intercalate lithium ion, and an anode formed from other compound(s) able to reversibly intercalate and de-intercalate lithium ion. When the battery is charged, Lithium ion is de-intercalated from its cathode and intercalated into its anode. The reverse takes place when the battery is discharged. A lithium ion battery basically comprises an electrode core and a nonaqueous electrolyte, both sealed in the battery case. The electrode core comprises a battery electrode comprising an anode, a cathode and a membrane used to separate the anode from the cathode. The cathode comprises a current collector and a cathode material coated on and/or filled in the current collector. The cathode material comprises a cathode active substance, a conductive additive and an adhesive.

It is known that the cycling performance of a battery basically depends on reversibility and structural stability of the cathode active substance in a lithium ion battery during lithium ion intercalation and de-intercalation. The conventional anode active substance that can reversibly intercalate and de-intercalate in this field comprises $Li_xNi_{1-y}CoO_2$, wherein $0.9 \leq x \leq 1.1$, $0 \leq y \leq 1.0$; $Li_{1+a}M_bMn_{2-b}O_4$, wherein $-0.1 \leq a \leq 0.2$, $0 \leq b \leq 1.0$, M is one of Li, B, Mg, Al, Ti, Cr, Fe, Co, Ni, Cu, Zn, Ga, Y, F, I and S; and $Li_mMn_{2-n}B_nO_2$, wherein $0.9 \leq m \leq 1.1$, $0 \leq n \leq 1.0$, and B is a transition metal. The lithium ion battery which comprises the above-mentioned material especially lithium manganate ($LiMn_2O_4$) as a cathode active substance has a lower specific capacity and the capacity of the battery decreases rapidly with the increase of cycle number of charge-discharge of the battery, whereby resulting in a lower cycling performance of the battery.

It is found after research that the main reason for the lower cycling performance of the Lithium ion battery is that the characteristic of the anode active substance has changed due to the reaction between the anode active substance and electrolyte. At present, in order to improve the cycling performance of the battery, a lot of studies on surface treatment to cathode active substance especially to lithium manganate in the lithium ion battery to prevent the reaction between the cathode active substance and electrolyte have been given.

For example, U.S. Pat. No. 5,783,328 discloses a process of treating lithium manganese represented by the stoichiometric formula $Li_xMn_2O_{4+d}$ (wherein $0.9 \leq x \leq 1.2$ and $0 \leq d \leq 0.4$). The process involves the steps of a) treating said lithium manganese oxide particles with at least one water soluble metal salt of a carboxylic acid to form a coating of said metal salt on the surface of said particles, and b) heating said treated lithium manganese oxide particles in an atmosphere comprising carbon dioxide gas for 1-20 hours.

By means of coating metal carbonate on the surface of lithium manganate, the cycling performance of the resulted lithium ion battery with this lithium manganate is improved. However, the specific capacity of this lithium ion battery is lowered since metal carbonate cannot act as an anode active substance.

SUMMARY OF THE INVENTION

An object of the invention is to overcome the problems that the lithium ion battery in the prior art has a lower specific capacity and poor cycling performance, and to provide a battery cathode that can improve the specific capacity and cycling performance of lithium ion battery and a lithium ion battery using such a cathode. Another object of the invention is to provide processes for preparing them.

The battery cathode according to the invention comprises a current collector and a cathode material coated on and/or filled in the current collector, and said cathode material comprises a cathode active substance, a conductive additive and an adhesive, wherein said anode active substance is coated with a layer of lithium cobaltate ($LiCoO_2$) on the surface thereof, and the content of lithium cobaltate is 0.1-15 wt % (weight percent) based on the weight of cathode active substance.

The process for preparing the battery cathode according to the invention comprises coating a slurry comprising a cathode active substance, a conductive additive and an adhesive on and/or filling it in a current collector, drying and optionally rolling the current collector, wherein it further comprises coating a layer of lithium cobaltate on the surface of the cathode active substance, and the procedure for forming a layer of lithium cobaltate on the surface of the cathode active substance comprises the following steps:

(1) contacting and reacting an aqueous solution comprising a cobalt salt and a cathode active substance with a precipitant of the cobalt salt by stirring at the reaction temperature of 10-90° C.;

(2) separating the resultant obtained in step (1) into solid and liquid, and washing and drying the resulted solid to prepare a cathode active substance coated with cobalt compound;

(3) uniformly mixing the cathode active substance coated with cobalt compound obtained in step (2) with a paste comprising lithium carbonate and/or lithium hydroxide and a non-soluble organic solvent in a mole ratio of Co:Li=1:0.8-1.2, and then drying the resultant to remove the solvent, wherein lithium comes from lithium carbonate and/or lithium hydroxide, and cobalt comes from the cobalt compound formed in step (2);

(4) calcining the mixture obtained in step (3) at 450-900° C. for 4-20 hours to prepare an cathode active substance coated with lithium cobaltate on the surface thereof.

The lithium ion battery according to the invention comprises an electrode core and a nonaqueous electrolyte, both sealed in a battery case, and said electrode core comprises a cathode, an anode and a membrane between the cathode and anode, wherein the cathode is the cathode provided by the present invention.

The process for preparing a lithium ion battery according to the invention comprises sealing a nonaqueous electrolyte and an electrode core which comprises a cathode, an anode and a membrane between the anode and cathode into a battery case, wherein the cathode is the cathode provided by the present invention.

In the cathode according to the invention, the lithium cobaltate formed on the surface of the cathode active substance by precipitant process which comprises coating a cobalt compound on the cathode active substance, mixing the resultant with lithium salt to obtain a mixture and then calcining the mixture, on the one hand, may provide a part of capacity; on the other hand, may form a protective layer on the surface of cathode active substance to prevent the reaction between the cathode active substance and electrolyte so that the cycling performance can be greatly improved. For example, the lithium ion battery prepared in the example 1 comprising the cathode with lithium manganate being coated with 2 wt % of lithium cobaltate used as the cathode active substance has an initial specific capacity up to 120 mAh/g and cycle span life of 151 times at 55° C. (the cycle number when the capacity decreased to 80 percent of the initial capacity). By comparison, the initial specific capacity of the battery prepared in the comparative example 1 comprising the cathode with lithium manganate not being coated by lithium cobaltate on the surface as the cathode active substance is only 102 mAh/g, and cycle span life of the same is only 30 times at 55° C.

DETAILED DESCRIPTION OF THE PREFERRED EMBODIMENTS

Figure 1:
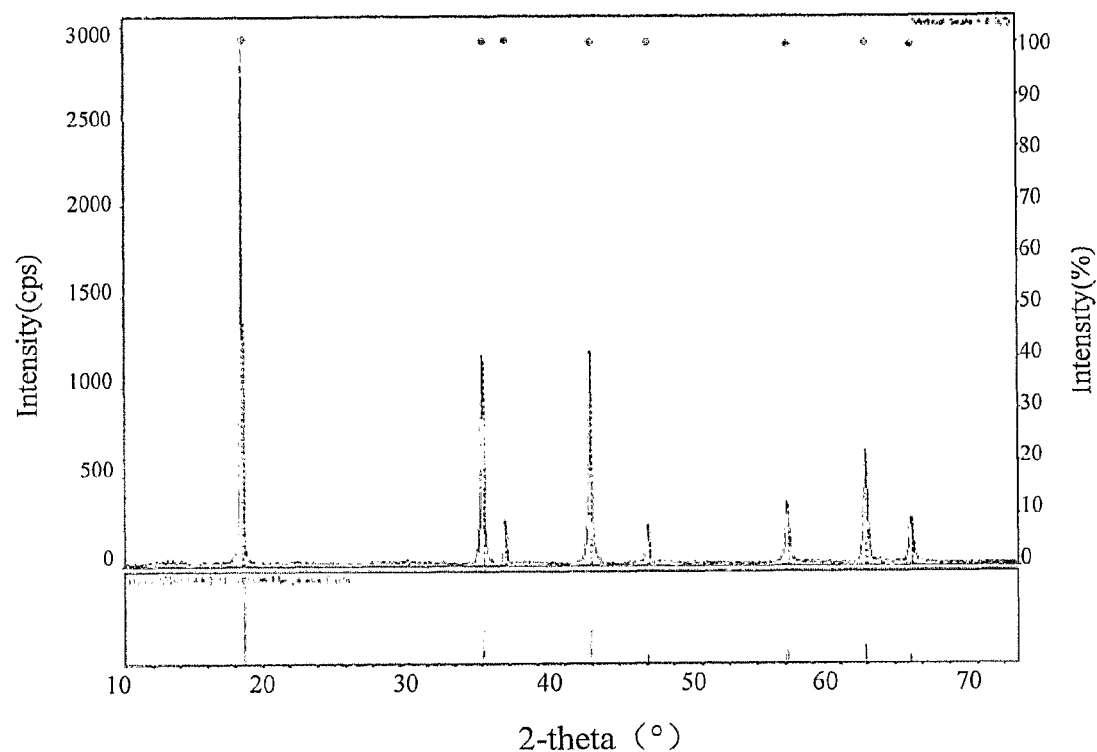
FIG. 1 is a XRD spectrum for lithium manganate as the cathode active substance according to the example 1 of the invention.

The content of lithium cobaltate in the cathode according to the invention is preferably from 0.1 wt % to 12 wt %, and more preferably from 0.5 wt % to 12 wt % based on the weight of cathode active substance.

The cathode active substance in the cathode according to the invention is not specially limited and may be any conventional cathode active substance able to reversibly intercalate and de-intercalate lithium ion in the field, preferably at least one selected from the group consisting of $Li_xNi_{1-y}CoO_2$ (wherein $0.9 \leq x \leq 1.1$, $0 \leq y \leq 1.0$), $Li_{1+a}M_bMn_{2-b}O_4$ (wherein $-0.1 \leq a \leq 0.2$, $0 \leq b \leq 1.0$, M is one of Li, B, Mg, Al, Ti, Cr, Fe, Co, Ni, Cu, Zn, Ga, Y, F, I and S), and $Li_mMn_{2-n}B_nO_2$ (wherein B is a transition metal, $0.9 \leq m \leq 1.1$, $0 \leq n \leq 1.0$). The advantages of the invention will be more remarkable when lithium manganate ($LiMn_2O_4$) is used as the cathode active substance since lithium manganate is easier to react with electrolyte. Therefore, lithium manganate is preferably used as the cathode active substance in the embodiments of the invention.

The conductive additive is not specially limited and may be any conventional cathode conductive additive in the field such as at least one selected from acetylene black, conductive carbon black and conductive graphite. Based on the weight of cathode active substance, the amount of the conductive additive is preferably from 1 wt % to 15 wt %, more preferably from 2 wt % to 10 wt %.

The adhesive can be any one known to those skilled in the art, for example fluorinated resin and polyolefin such as at least one of polyvinylidene fluoride (PVDF), polytetrafluoroethylene (PTFE) and styrene butadiene rubber (SBR). Based on the weight of the cathode active substance, the content of adhesive is preferably from 0.01 wt % to 8 wt %, more preferably from 0.02 wt % to 5 wt %.

The cathode may be prepared by a conventional process such as a process comprising mixing the cathode active substance, conductive additive and adhesive with a solvent to obtain a mixture, then coating the mixture on and/or filled the same in the current collector followed by drying and optionally rolling the resulted current collector. Wherein the solvent may be at least one selected from the group consisting of N-methylpyrrolidone (NMP), N,N-dimethyl formamide (DMF), N,N-diethyl formamide (DEF), dimethyl sulphoxide (DMSO), tetrahydrofuran (THF), water and alcohol. Any amount of solvent, as long as it can provide the resulted slurry with the abilities of adhesion and flow to be able to be coated on the current collector, is suitable. Based on the weight of cathode active substance, the amount of solvent is preferably from 5 wt % to 70 wt %, more preferably from 15 wt % to 50 wt %. The process and conditions for drying and rolling are known by those skilled in the art. The anode current collector may be any conventional cathode current collector in a lithium ion battery such as an aluminum foil.

With regard to the process for preparing the cathode according to the invention, it may further comprise adding a complexing agent into the reactor to mix with the cathode active substance in step (1), and the complexing agent may be at least one selected from the group consisting of ammonia, ethylenediamine, acetic acid and acetylacetone. Preferably, cobalt salt, precipitant and complexing agent are continuously poured in the forms of respective aqueous solution at such rates that mole ratio of $Co^{2+}$:precipitant:complexing agent in the reaction system is 1:0.9-2.5:0.2-5. The reaction continues for such a long time that the amount of cobalt compound in the cathode active substance meets the requirement.

Cobalt salt may be any cobalt salt soluble in water, preferably at least one of cobalt nitrate, cobalt sulfate, cobalt chloride, cobalt acetate. Preferably, the concentration of aqueous solution thereof is 0.05-5 mol/L, more preferably 0.1-4 mol/L.

The precipitant may be at least one selected from the group consisting of sodium hydroxide, potassium hydroxide, sodium carbonate, sodium bicarbonate, potassium carbonate, potassium bicarbonate, ammonium carbonate, ammonium bicarbonate, sodium oxalate, potassium oxalate, ammonium oxalate. Preferably, the concentration of aqueous solution thereof is 0.05-10 mol/L, more preferably 0.1-8 mol/L.

The aqueous solution of complexing agent is 0.05-10 mol/L, preferably 0.1-8 mol/L. Mole ratio of $Co^{2+}$ to complexing agent is preferably as follows: $Co^{2+}$: $NH_3$=1:0.2-5, $Co^{2+}$: ethylenediamine=1:0.2-3, $Co^{2+}$: acetic acid=1:0.2-5, and $Co^{2+}$: acetylacetone=1:0.2-3.5. A complexing agent may not be added when the precipitant is ammonium carbonate, ammonium bicarbonate or ammonium oxalate since ammonium carbonate, ammonium bicarbonate and ammonium oxalate themselves possess the effect of complexation.

In step (2) of the above process according to the invention, any conventional process may be used to wash and dry the prepared solid. For example, water-spraying method or immersion method may be used to wash the prepared solid, and natural drying process, heating drying process, forced air drying process, vacuum drying process may be used as the drying process, wherein the drying temperature may be from room temperature to 110° C.

During coating lithium cobaltate on the surface of the cathode active substance, the non-soluble organic solvent is referred to as any organic solvent that cannot dissolve lithium carbonate and lithium hydroxide. Preferably, it is a low-carbon alcohol having 1-6 carbon atoms such as methanol, ethanol, propyl alcohol, isopropyl alcohol, butyl alcohol, tertbutyl alcohol, pentyl alcohol, hexyl alcohol and cyclohexyl alcohol, more preferably ethanol. There is no particular limit to the amount of the non-soluble organic solvent in step (3), as long as lithium carbonate or lithium hydroxide can form uniform slurry, the slurry can be uniformly mixed with the cathode active substance coated with cobalt compound and the mixture is not too viscous.

During coating the surface of the cathode active substance with lithium cobaltate, preferably, the cathode active substance coated with cobalt compound obtained in step (2) is mixed with lithium carbonate and/or lithium cobaltate in a mole ratio of Co:Li=1:0.8-1.2, more preferably Li:Co=1:1.

The anode in the lithium ion battery according to the invention may be commercially available, and may also be prepared by any known process. The composition of anode is known to those skilled in the art, and may generally comprise an anode active substance, a conductive additive and an adhesive.

The anode active substance may be any conventional anode active substance with the property of reversibly intercalating/de-intercalating lithium ion in the art such as at least one selected from natural graphite, artificial graphite, petroleum coke, organic pyrogenic carbon, medium phase carbon microsphere, carbon fiber, tin alloy and silicon alloy, preferably artificial graphite.

The adhesive may be fluorinated resin and/or polyolefin such as at least one selected from polyvinylidene fluoride (PVDF), polytetrafluoroethylene (PTFE) and styrene butadiene rubber (SBR). Based on the weight of the anode active substance, the amount of the adhesive is preferably from 0.0wt% to 8 wt%, more preferably from 0.02 wt% to 5 wt%.

The conductive additive may be any conventional anode conductive additive in the art such as at least one selected from acetylene black, conductive carbon black and conductive graphite. Based on the weight of cathode active substance, the amount of the conductive additive is from 1 wt% to 15 wt%, preferably from 2 wt% to 10 wt%.

Any conventional process for preparation may be used to prepare the anode. For example, the anode may be prepared by mixing the anode active substance, conductive additive and adhesive with a solvent to obtain a mixture, and then coating the mixture on and/or fill the mixture in a current collector, and subsequently drying and optionally rolling the resulted current collector. Wherein the solvent may be at least one selected from the group consisting of N-methylpyrrolidone (NMP), N,N-dimethyl formamide (DMF), N,N-diethyl formamide (DEF), dimethyl sulphoxide (DMSO), tetrahydrofuran (THF), water and alcohol. Any amount of solvent, as long as it can provide the resulted slurry with the abilities of adhesion and flow to be able to be coated on the current collector, is suitable. In general, based on the weight of anode active substance, the amount of solvent is from 100 wt% to 150 wt%. In this case, the process and conditions for drying and rolling are known to those skilled in the art. The anode current collector may be any conventional cathode current collector in a lithium ion battery such as a copper foil.

In the lithium ion battery according to the invention, the membrane is disposed between the anode and cathode, and has the performances of electric insulation and liquid holding. The membrane may be selected from various membranes used in the lithium ion battery such as polyolefin micro porous membrane. The location, characteristic and type of the membrane are known to those skilled in the art.

The nonaqueous electrolyte may be any conventional non-aqueous electrolyte comprising lithium salt electrolyte and nonaqueous solvent. For example, the lithium salt electrolyte may be at least one selected from the group consisting of lithium hexafluorophosphate ($LiPF_6$), $LiClO_4$, $LiBF_4$, $LiAsF_6$, lithium halide, $LiAlCl_4$ and lithium fluorohydrocarbylsulphonate. The nonaqueous solvent may be a mixture of chain acid ester and cyclic acid ester, wherein chain acid ester may be at least one selected from the group consisting of dimethyl carbonate (DMC), diethyl carbonate (DEC), ethyl methyl carbonate (EMC), methyl phenyl carbonate (MPC), diphenyl carbonate (DPC) and other chain organic ester comprising fluorine, sulfur or non-saturation bond, and cyclic acid ester may be at least one selected from the group consisting of ethylene carbonate (EC), propylene carbonate (PC), vinylene carbonate (VC), γ-butyrolactone (γ-BL), sultone and other cyclic organic ester comprising fluorine, sulfur or non-saturation bond. The concentration and the amount of the electrolyte are generally 0.5-2.9 mol/L and 1.5-4.9 g/Ah, respectively.

As for the process for preparing the lithium ion battery according to the invention, the other procedures are known to those skilled in the art except that the preparation of the cathode is according to the invention. In general, the process for preparing the lithium ion battery comprises winding up the prepared anode, cathode with a membrane to form an electrode core, putting the electrode core into a battery case, pouring electrolyte and sealing the battery case. In such a way, the lithium ion battery according to the invention is completed.

The invention will be described in detail by following exemplified examples.

Example 1

(1) Preparation of the Cathode 0.2 mol/L cobalt nitrate($Co(NO_3)_2$) aqueous solution, 0.4 mol/L sodium hydroxide aqueous solution and 1 mol/L ammonia were continuously pumped by a pistion pump at the same rate of 30 ml/min into a 10 liters reactor with a stirrer comprising 3 L deionized water and 1 kg $LiMn_2O_4$. At the same time, stirring was kept on and reaction temperature was controlled at 20° C. 60 minutes later, liquid supply was stopped and stirring was kept on for another 10 minutes.

The resulted mixture of solid and liquid was collected to perform a separation between solid and liquid. The resulted solid was washed with deionized water until the pH value of the washing liquid was below 8 and dried at 100° C. in air to obtain the product of $LiMn_2O_4$ coated with cobalt compound.

Figure 2:
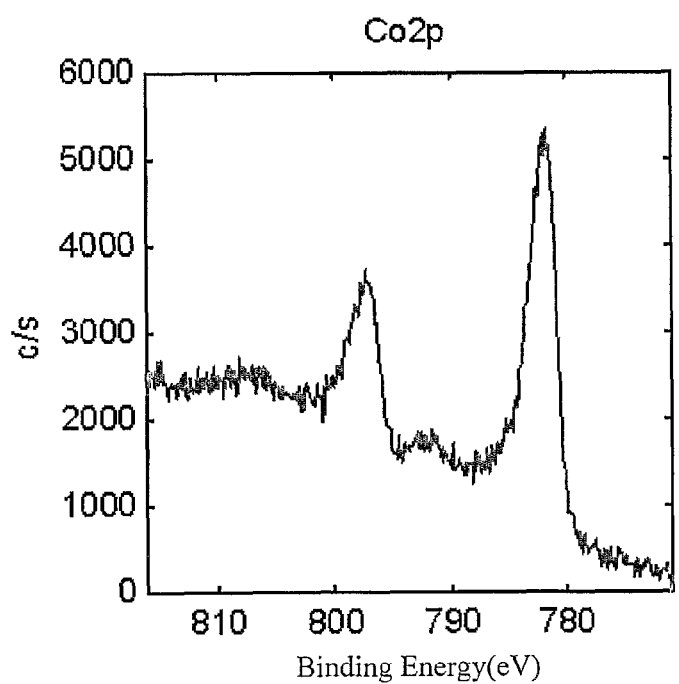
FIG. 2 is a XPS spectrum for lithium manganate as the cathode active substance according to the example 1 of the invention.

26.6 g lithium carbonate ($Li_2CO_3$) was put into a ball mill, and 100 ml ethanol was also added therein to obtain slurry by milling for 2 hours. Then, the above $LiMn_2O_4$ coated with cobalt compound and another 300 ml ethanol were added to the slurry followed by 30 minutes milling. The resulted mixture was dried to remove the ethanol therein, then calcined at 550° C. for 15 hours. After cooling at the room temperature, $LiMn_2O_4$ coated by 3.5 wt% lithium cobaltate used as cathode active substance of the lithium ion battery according to the invention was obtained. The XRD result shows that the product is lithium manganate with a spinel structure, as shown in FIG. 1. The XPS spectrum shows that the $LiMn_2O_4$ surface is a layer of lithium cobaltate, as shown in FIG. 2.

100 g $LiMn_2O_4$ obtained as above as the cathode active substance, 4 g PVDF as the adhesive and 4 g acetylene black as the conductive additive were mixed with 40 g NMP with stirring to form uniform cathode slurry.

The resulted slurry was uniformly coated on aluminum foil and then dried at 150° C. After being rolled, the aluminum foil was cut into several cathode plates with a size of 540 mm×43.5 mm, and respectively comprising 4.1 g cathode active substance.

(2) Preparation of Anode 100 g natural graphite as the anode active substance, 4 g PTFE as the adhesive, 4 g carbon black as the conductive additive were mixed with 120 g water with vacuum stirring to form a uniform anode slurry.

The slurry was uniformly coated on copper foil and then dried at 90° C. After being rolled, the copper foil was cut into several anode plates with a size of 500 mm×44 mm, and respectively comprising 3.8 g natural graphite as the anode active substance.

(3) Assembly of the Battery

Figure 3:
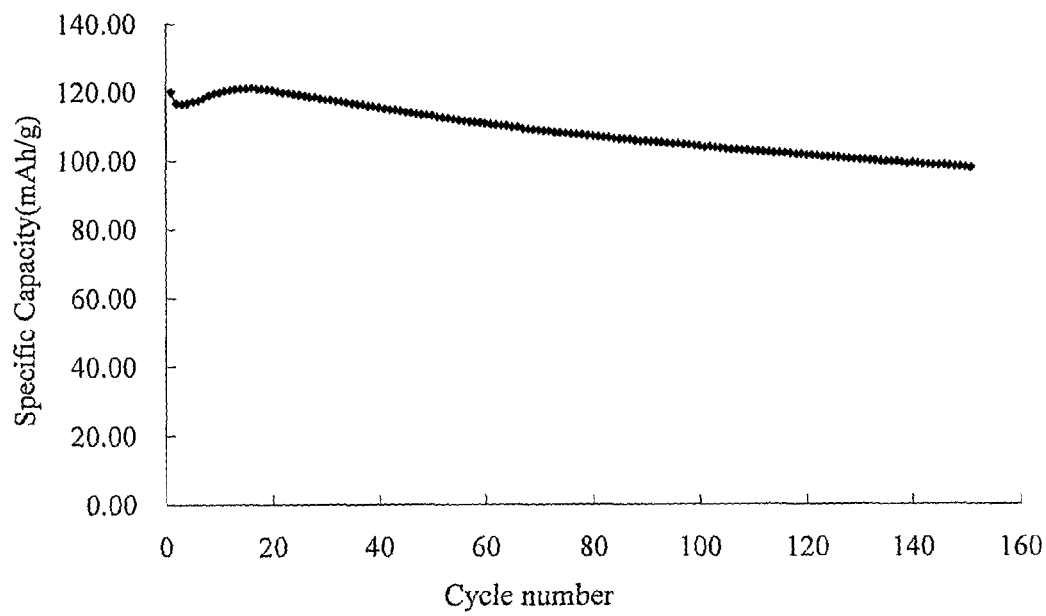
FIG. 3 is a graph showing the cycling performance at 55° C. for the lithium ion battery according to the example 1 of the invention.

The anode plate and cathode plate were winded up with polypropylene membrane to form a square shape of electrode core for a lithium ion battery. Then, $LiPF_6$ was dissolved in a mixed solvent with EC/DMC=1:1 to form a 1 mol/L nonaqueous electrolyte. The electrolyte was poured in a battery case according to a value of 3.8 g/Ah. The lithium ion battery was prepared after sealing. The battery was charged and discharged with a 0.2 C current to measure the performances of initial specific capacity and cycle span life. The result showed that the battery had an initial specific capacity of 120 mAh/g and a cycle span life of 151 times at 55° C. as shown in FIG. 3.

Comparative Example 1

Figure 4:
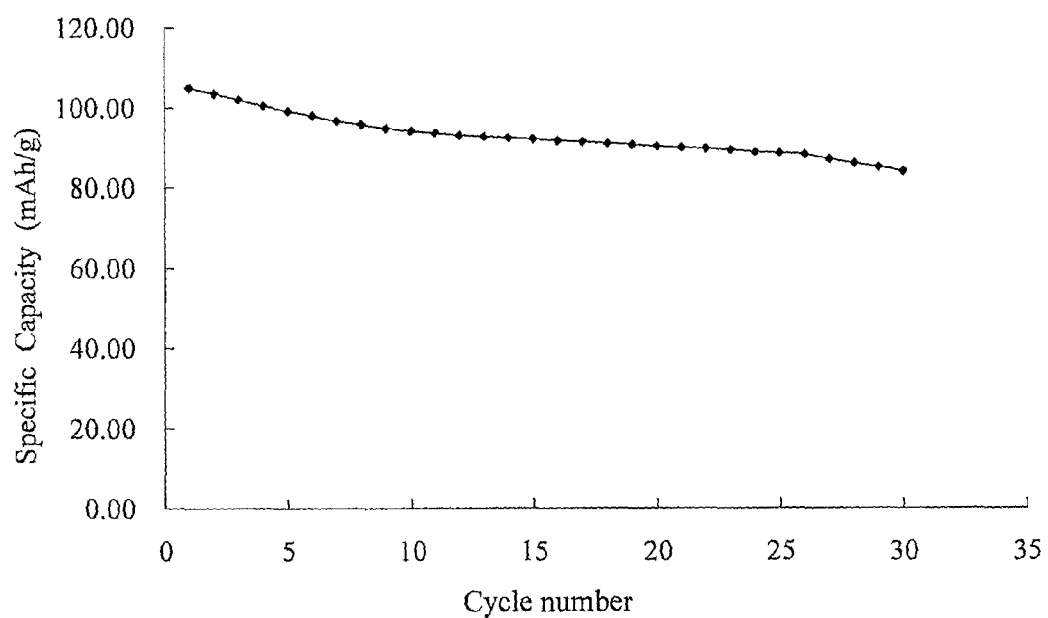
FIG. 4 is a graph showing the cycling performance at 55° C. for the lithium ion battery according to the comparative example 1.

The lithium ion battery was prepared according to example 1, except for the $LiMn_2O_4$ surface being not coated by lithium cobaltate. The battery was charged and discharged with a 0.2 C current to measure the performances of initial specific capacity and cycle span life. The result shows that the battery had a initial specific capacity of 105 mAh/g and a cycle span life of 30 times at 55° C. as shown in FIG. 4.

Examples 2-4

The lithium ion batteries were prepared according to example 1, except for the conditions illustrated in following table 1. The performances of these batteries measured according to the process described in example 1 were illustrated in the following table 2.

TABLE 2

|  | Ex. 1 | C. Ex. 1 | Ex. 2 | Ex. 3 | Ex. 4 |
|---|---|---|---|---|---|
| initial specific capacity (mAh/g) | 120 | 102 | 118 | 115 | 116 |
| cycle number | 151 | 30 | 153 | 147 | 145 |

Note:
Ex. represents example and C. Ex. represents comparative example.

It can be seen from table 2 that the batteries comprising the cathode provided by the present invention possess higher specific capacity and improved cycling performance compared with that of the prior art.

What we claim is:

1. A process for preparing a cathode comprising a current collector and a cathode material coated on and/or filled in the current collector, said cathode material comprising a cathode active substance, a conductive additive and an adhesive, the process comprises coating a slurry comprising the cathode active substance, the conductive additive and the adhesive on the current collector and/or filling the slurry in the current collector, drying and optionally rolling the resulted current collector, wherein the process further comprises forming a layer of lithium cobaltate on a surface of the cathode active substance, the procedure for forming the layer of lithium cobaltate on the surface of the cathode active substance comprises the following steps:

(1) contacting and reacting a cobalt salt and a cathode active substance with a precipitant of the cobalt salt by stirring at a reaction temperature of 10-90° C.;

(2) separating the reaction product obtained in step (1) into solid and liquid, washing and drying the resulted solid to prepare the cathode active substance coated with cobalt compound;

(3) uniformly mixing the cathode active substance coated with cobalt compound obtained in step (2) with a slurry which comprises non-soluble organic solvent and a lithium carbonate and/or lithium hydroxide in a mole ratio of Co:Li=1:0.8-1.2 to prepare a mixture, and then drying the mixture to remove the solvent comprised therein, wherein lithium comes from lithium carbonate and/or lithium hydroxide, and cobalt comes from the cobalt compound formed in step (2);

(4) calcining the mixture formed in step (3) at 450-900° C. for 4-20 hours to prepare the cathode active substance coated with lithium cobaltate on the surface thereof, and the content of lithium cobaltate is 0.1-15wt % based on a weight of the cathode active substance.

TABLE 1

|  |  | Example 1 | Example 2 | Example 3 | Example 4 |
|---|---|---|---|---|---|
| Cobalt salt | species | $Co(NO_3)_2$ | $CoSO_4$ | $CoCl_2$ | $Co(NO_3)_2$ |
|  | mol/L | 0.2 | 3 | 3 | 1 |
|  | mL/min | 30 | 7 | 4 | 8.8 |
| precipitant | species | NaOH | $Na_2CO_3$ | sodium oxalate | $(NH_4)_2CO_3$ |
|  | mol/L | 0.4 | 1.5 | 1 | 8 |
|  | mL/min | 30 | 14 | 18 | 2.2 |
| Complexing agent | species | ammonia | $(NH_3CH_2)_2$ | acetylacetone | — |
|  | mol/L | 1 | 8 | 1 | — |
|  | mL/min | 30 | 7 | 4 | — |
| term for supplying liquid (min) |  | 60 | 50 | 70 | 20 |
| reaction temperature (° C.) |  | 20 | 30 | 90 | 80 |
| lithium salt | species | $Li_2CO_3$ | $Li_2CO_3$ | LiOH | $Li_2CO_3$ |
|  | amount(g) | 26.6 | 47 | 46.5 | 15.6 |
| calcinations temperature (° C.) |  | 550 | 650 | 750 | 850 |
| calcinations time (h) |  | 15 | 10 | 8 | 5 |
| amount of lithium cobaltate (wt %) |  | 3.5 | 6.1 | 10 | 1.7 |

2. The process according to claim 1, wherein it further comprises contacting and reacting a complexing agent with a cobalt salt, a precipitant for the cobalt salt and an cathode active substance in step (1), and the complexing agent is one or more selected from the group consisting of ammonia, ethylenediamine, acetic acid and acetylacetone; the cobalt salt, precipitant and complexing agent are continuously poured in the forms of respective aqueous solution to the cathode active substance or the mixture of the cathode active substance and water at such rates that the mole ratio of $Co^{2+}$: precipitant: complexing agent in the container is 1: 0.9-2.5: 0.2-5; and the concentration of the aqueous solution of the complexing agent is 0.1-8 mol/L.

3. The process according to claim 1, wherein the cobalt salt is one or more of cobalt nitrate, cobalt sulfate, cobalt chloride, cobalt acetate; and the concentration of the aqueous solution thereof is 0.1-4 mol/L.

4. The process according to claim 1, wherein the precipitant is one or more selected from the group consisting of sodium hydroxide, potassium hydroxide, sodium carbonate, sodium bicarbonate, potassium carbonate, potassium bicarbonate, ammonium carbonate, ammonium bicarbonate, sodium oxalate, potassium oxalate, ammonium oxalate; and the concentration of the aqueous solution thereof is 0.05-10 mol/L.

5. The process according to claim 1, wherein the non-soluble organic solvent in step (3) is a low carbon alcohol having 1-6 carbon atoms.

6. The process according to claim 2, wherein the cobalt salt is one or more of cobalt nitrate, cobalt sulfate, cobalt chloride, cobalt acetate; and the concentration of the aqueous solution thereof is 0.1-4 mol/L.

7. The process according to claim 2, wherein the precipitant is one or more selected from the group consisting of sodium hydroxide, potassium hydroxide, sodium carbonate, sodium bicarbonate, potassium carbonate, potassium bicarbonate, ammonium carbonate, ammonium bicarbonate, sodium oxalate, potassium oxalate, ammonium oxalate; and the concentration of the aqueous solution thereof is 0.05-10 mol/L.

8. The process according to claim 1, wherein the content of lithium cobaltate is 0.5-12 wt % based on the weight of the cathode active substance.

9. The process according to claim 1, wherein the cathode active substance is one or more selected from the group consisting of $Li_xNi_{1-y}CoO_2$, wherein $0.9 \leq x \leq 1.1$, $0 \leq y \leq 1.0$; $Li_{1+a}M_bMn_{2-b}O_4$, wherein $-0.1 \leq a \leq 0.2$, $0 \leq b \leq 1.0$, M is one of Li, B, Mg, Al, Ti, Cr, Fe, Co, Ni, Cu, Zn, Ga, Y, F, I and S; and $Li_mMn_{2-n}B_nO_2$, wherein B is a transition metal, $0.9 \leq m \leq 1.1$, $0 \leq n \leq 1.0$.

10. The process according to claim 1, wherein the cathode active substance is $LiMn_2O_4$.

11. The process according to claim 2, wherein the cathode active substance is one or more selected from the group consisting of $Li_xNi_{1-y}CoO_2$, wherein $0.9 \leq x \leq 1.1$, $0 \leq y \leq 1.0$; $Li_{1+a}M_bMn_{2-b}O_4$, wherein $-0.1 \leq a \leq 0.2$, $0 \leq b \leq 1.0$, M is one of Li, B, Mg, Al, Ti, Cr, Fe, Co, Ni, Cu, Zn, Ga, Y, F, I and S; and $Li_mMn_{2-n}B_nO_2$, wherein B is a transition metal, $0.9 \leq m \leq 1.1$, $0 \leq n \leq 1.0$.

12. The process according to claim 2, wherein the cathode active substance is $LiMn_2O_4$.

\* \* \* \* \*